Jan. 31, 1961    G. A. LYON    2,970,011
WHEEL COVER
Filed Oct. 7, 1957
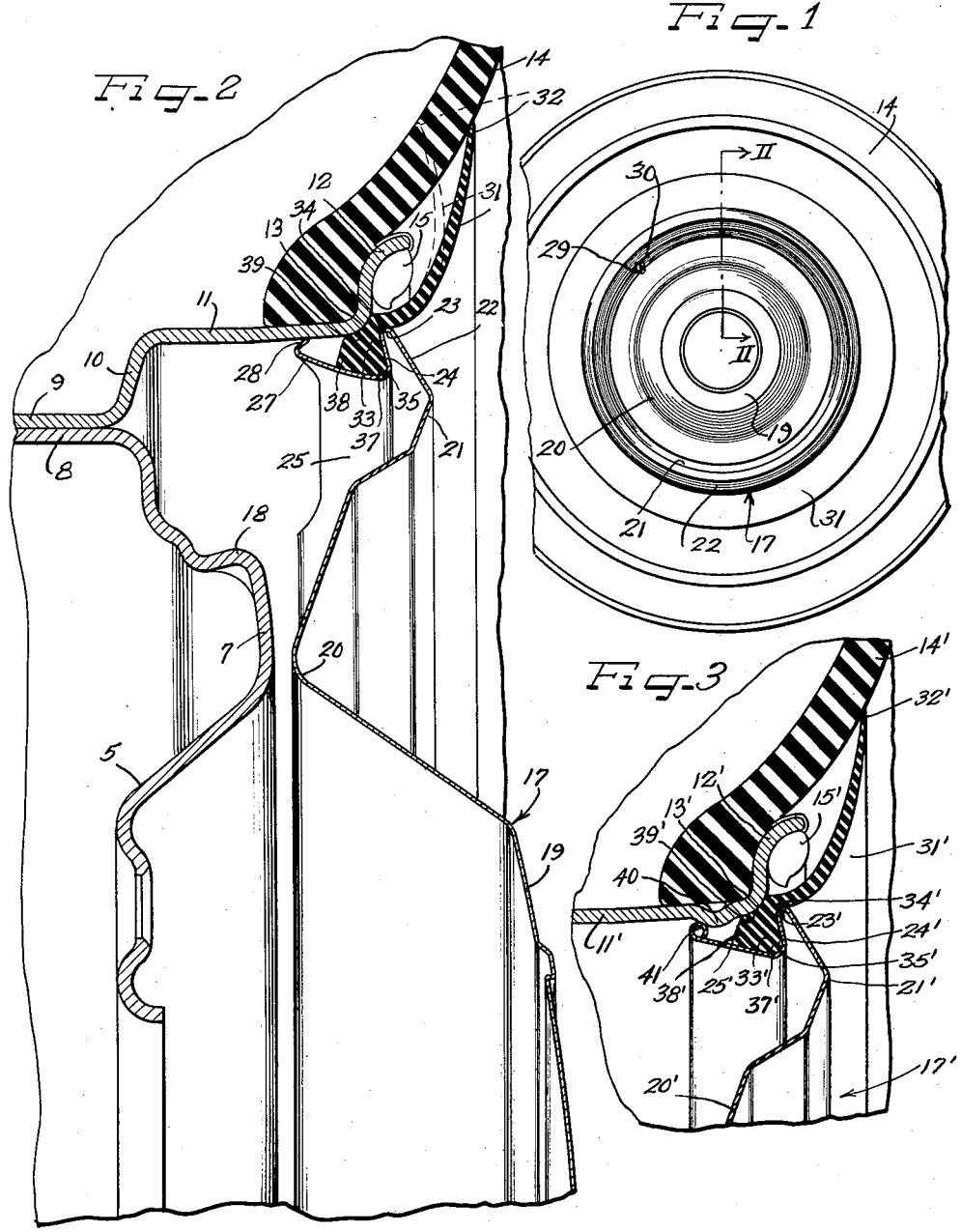
Inventor
GEORGE ALBERT LYON
Attys.

United States Patent Office 2,970,011
Patented Jan. 31, 1961

2,970,011

WHEEL COVER

George Albert Lyon, 13881 W. Chicago Blvd.,
Detroit 28, Mich.

Filed Oct. 7, 1957, Ser. No. 688,621

3 Claims. (Cl. 301—37)

The present invention relates to improvements in wheel structures and more particularly concerns an improved cover structure and simulated white tire sidewall arrangement.

For ornamental purposes, automobile tires are commonly provided with white sidewalls, the remainder of the tire being of a more or less black appearance. The white rubber used for the white sidewall is applied as a veneer and is of a different composition from that of the remainder or body portion of the tire and actually requires a different vulcanizing treatment to the extent that the temperature and time of cure are somewhat different than for the black rubber of the tire body. This has created some necessity for compromise in the vulcanization of tires with white sidewalls, generally resulting in a sacrifice of quality in the body of the tire including the tread and principal sidewall portions thereof. To overcome the disadvantages of cure, compromise, it has been proposed to secure the white sidewall portions or veneer to the sidewall of the tire after the tire has been vulcanized. Such after-attached sidewall members are inherently liable to such disadvantages as peeling, and the like, and of course require a separate attaching or vulcanizing operation that raises costs.

It has also been heretofore proposed to provide separate simulated white sidewall ring members that are secured between the terminal flange of the tire rim and the bead portion of the tire and separably hug the sidewall of the tire. Such simulated or mock tire sidewall rings require, of course, that the tire be deflated in order to install the ring members. Should such simulated white sidewall rings become damaged, it is necessary to deflate the tire not only to remove the damaged ring but also to replace the ring. Furthermore, a disadvantage of such simulated sidewall rings is that, especially with tubeless tires there is liability of interference with proper sealing, gripping engagement of the tire bead portion with the opposing surfaces of the tire rim and more particularly the terminal flange between which and the tire bead the simulated sidewall ring is clampingly interposed.

It is, accordingly, an important object of the present invention to overcome the foregoing difficulties and disadvantages of the prior expedients and to provide a simulated tire sidewall of improved appearance and which can be applied, or removed, or replaced without disturbing the tire.

Another object of the invention is to provide an improved tire sidewall simulating member which serves also as means for covering the tire rim terminal flange as well as wheel balancing weights that may be carried by such flange.

A further object of the invention is to provide a novel tire sidewall simulating ring member which is adapted for optional assembly with a wheel cover for disposition over the outer side of the wheel.

Still another object of the invention is to provide an improved wheel cover construction which is especially suitable for use with a tire sidewall simulating ring member.

Yet another object of the invention is to provide a tire sidewall simulating flexible non-metallic ring device which is especially suitable for cooperation with a wheel cover for providing a cushioning, rattle proofing device and in this connection is adapted for clamped engagement with the tire rim.

A still further object of the invention is to provide a non-metallic tire sidewall simulating device which lends itself readily to various color effects.

Other objects, features and advantages of the present invention will be readily apparent from the following detailed description of certain preferred embodiments thereof, taken in conjunction with the accompanying drawing, in which:

Figure 1 is an outer side elevational view of a wheel structure embodying features of the invention;

Figure 2 is an enlarged fragmentary radial sectional detail view taken substantially on the line II—II of Figure 1; and Figure 3 is a fragmentary radial sectional view similar to Figure 2 but showing a modification.

Having reference to Figures 1 and 2, the invention is shown as applied to a wheel including a disk spider wheel body 5 including an annular intermediate axially outwardly directed nose bulge 7. At its radially outer margin the wheel body 5 has an axially extending attachment flange 8 attached to a base flange 9 of a drop center multi-flange tire rim including a side flange 10 leading into a generally axially outwardly extending intermediate flange 11 merging at its axially outer side with a generally radially outwardly and then axially outwardly turned terminal flange 12, with a rounded annular generally radially outwardly and axially inwardly facing shoulder 13 at juncture of the intermediate and terminal flanges. A pneumatic tire 14 of the tubeless type is adapted to be supported by the tire rim. For balancing the wheel, weights 15 are adapted to be supported by the terminal flange in the crook or reentrant corner provided thereby.

To provide an ornamental and protective covering for the outer side of the wheel, a cover 17 is adapted to be applied thereover. In the present instance, the cover 17 is depicted as a full disk cover, that is, it is of a diameter to overlie not only the wheel body 5 but also the tire rim. On the other hand, the cover could be made as a ring member that overlies the tire rim and the adjacent portion of the wheel body while a central hub cap member (not shown) may be applied over the central portion of the wheel body with a terminal bead of the hub cap retained by means of retaining bumps 18 at the radially outer side of the nose bulge 7 of the wheel. In any event, the cover is preferably made from suitable sheet material such as stainless steel, brass, or the like drawn or pressed to form and susceptible of the desired finish such as polishing and plating, or painting or a combination of finishing treatments.

Centrally the wheel cover 17 is provided with a crown portion 19 projecting generally axially outwardly and having thereabout an annular inwardly dished intermediate portion 20 at the radially outer side of which is a marginal portion 21 adapted to overlie the tire rim and more particularly the side flange 10 and the intermediate flange 11. In the present instance, the marginal portion 21 is in the form of a generally axially outwardly projecting annular reinforcing rib of angular cross-section including a generally radially outwardly and axially inwardly sloping extremity flange portion 22 provided with a turned terminus edge affording a reinforcing and finishing bead-like structure 23 at juncture of the portion 22 with an undertuned generally radially inwardly and axially outwardly sloping continuous annular flange portion 24.

Means for maintaining the cover 17 on the outer side of the wheel in self-retained, press-on, pry-off relation comprise a generally axially inwardly extending flange structure 25 turned from and comprising extension of the underturned flange 24 and provided with generally axially inwardly projecting stiffly resiliently flexible retaining finger extensions 27 having retaining terminal means for retaining engagement with the intermediate flange 11, and in this instance comprising generally radially and axially outwardly oblique short and stiff gripping terminal flanges 28 engageable edgewise against the radially inwardly facing surface of the intermediate flange. The construction and relationship is such that normally the tips of the retaining terminals 28 extend to a slightly larger diameter than the diameter of the engaged surface of the intermediate flange 11. Thereby, in applying the cover to the outer side of the wheel, after a valve stem aperture 29 in the intermediate portion 20 of the cover has been registered with a valve stem 30 projecting from the side flange 10, axially inward pressure on the outer side of the cover causes the retaining terminal flanges 28 of the fingers to cam axially inwardly on the intermediate flange, thus compressing the retaining fingers and deflecting the same radially inwardly under resilient tension and affording substantial resilient gripping radially outward thrust to the terminal flanges 28, enhanced by the resiliency and tension of the flange structure from which the retaining fingers 27 extend and coacting therewith to provide a finger tensioning structure.

Advantageously, the cover marginal flange structure is utilized as means for supporting and retaining on the outer side of the wheel a non-metallic resiliently flexible ornamental and protective ring member 31 constructed and arranged to afford the appearance of the tire sidewall extending to a greater extent radially inwardly than normally permitted in view of the overlap of the terminal flange 12 with the bead portion of the tire. The sidewall simulating ring member 31 may be colored white so as to afford a white sidewall appearance for the tire, or the ring member may be of other preferred decorative color. Preferably the ring member 31 is made from a rubber-like material, for which synthetic, butyl rubber has been found especially desirable although other types of rubber-like material may, if preferred, be used. Butyl rubber has the desirable characteristics of excellent pigmentation capability, highly desirable durometer control, ease of molding, excellent memory or resiliency and elasticity qualities, resistance to aging, and compatibility with respect to the tire sidewall rubber material.

In a preferred form, the sidewall ring member 31 comprises a body portion of substantial radial width and tapered from a radially outer generally feathered tire sidewall engaging tip 32 toward a greater body thickness radially inwardly. In its normal condition prior to assembly with the tire, the body portion of the ring 31 is preferably cross-sectionally contoured and shaped of generally concave, convex form as shown in dash outline in Figure 2 to assume a more axially inward position in the radially outer portion thereof than after assembly with the tire. This enhances the hugging, self-positioning tensioned engagement of the tip 32 of the sidewall ring member with the tire sidewall portion that bulges into generally axially outwardly overhanging relation to the tire rim terminal flange 12 when the inner marginal portion of the ring member is engaged against the tire rim. Thereby, the tip 32 of the ring member is adapted to follow closely flexibly any changes in shape or movements of the tire sidewall and avoid flapping or gap relationship relative to the tire sidewall.

In the mounted relationship of the ring member 31 on the wheel, the axially inner face of the ring member arches in spaced relation over the terminal flange 12 of the tire rim and clears the wheel weight or weights 15, with the inner margin of the ring member retainingly, interlockingly interengageable clampingly between the tire rim shoulder 13 and the margin of the cover 17. To the latter end, the inner marginal portion of the ring member 31 is provided with a generally radially inwardly extending angular annular flange portion 33 which at juncture with the body portion of the ring member is provided with a generally axially outwardly and radially inwardly opening groove 34 receptive of the turned cover marginal shoulder 23. Both the cover edge shoulder 23 and the groove 34 are dimensioned to lie opposite the rim shoulder 13 in the assembly whereby the cover shoulder 23 is adapted to clamp the portion of the ring flange 33 therebehind firmly against the rim shoulder 13 by virtue of the axially inward drawing of the cover margin, or at least retention of such cover margin by the coaction of the retaining fingers 27 and more particularly the terminals 28 thereof with the intermediate flange 11 of the tire rim.

It will be observed in Figure 2, that the diameter of the cover edge shoulder 23 is sufficiently less than the diameter to which the radially innermost portions of the wheel weights 15 extend to afford therebetween a gap ample to accommodate freely the thickness of the inner portion of the ring member 31 therebetween.

In order to assure not only a thorough interengaged relationship of the ring member 31 with the cover in the unassembled relationship with respect to the wheel, but also to assure thorough retention of the inner marginal portion of the ring member 31 against pulling out from the clamped engagement between the cover edge and the tire rim in the assembled, service relationship of the cover and ring assembly with the wheel, the angular inner marginal flange 33 of the ring member is greatly enlarged in cross-section relative to the general thickness of the ring member to afford an interlock rib radially inwardly from the groove 34. In addition, the cover marginal underturned flange structure is constructed and arranged to afford an ample chambered relationship relative to the tire rim to accommodate the rib flange of the ring member. To this end, the underturned cover marginal flange portions 24 and 25 are divergently related in such a manner as to provide a reentrant groove 35 wherein to accommodate a generally axially outwardly projecting rib ridge portion 37 of the flange rib 33. It will be observed that the underturned flange portion 24 extends generally axially outwardly as well as radially inwardly behind the cover marginal portion 22 so that the radially inner extremity of the flange portion 24 at juncture with the flange portion 25 is disposed axially outwardly relative to the cover shoulder 23. In addition, the flange portion 24 is of a width to extend substantially radially inwardly beyond the rim shoulder 13 to afford a sufficient clearance of the inturned flange portion 25 radially inwardly from the rim shoulder 13 to accommodate the flange rib 33 and especially an axially inwardly extending portion 38 of the ring member flange rib which in the assembly is interposed between the flange portion 25 and the axially outer marginal portion of the tire rim intermediate flange 11.

In order to afford the desirable substantial radially inward spacing of the flange portion 25 to accommodate the relatively massive rib 33 of the ring member, and yet maintain the advantages of shortness and stiffness in the retaining finger terminals 28 of which there are, of course, a circumferential plurality, the flange 25 is angled generally radially outwardly as well as extending axially inwardly and with the retaining fingers 27 extending as a continuation of the generally outwardly flaring oblique angularity of the flanges 25, substantially as shown in Figure 2. Thereby, the terminal portions of the retaining fingers 27 are disposed substantially closer to the diameter of the inner face of the intermediate flange 11 of the tire rim against which the short stiff retaining terminals 28 are engageable. For additional stiffness, the flange portion 25 and the retaining finger extensions 27 may be arcuately formed or curved in the axial direction as shown. It has been found that by the outwardly flaringly angled disposition of the flange 25 and the retaining fingers 27 improved resilient stiffness is attained in the retaining fingers which substantially aids in retaining the cover on the wheel and more especially with the inner margin of the ring member interposed between the margin of the cover and the tire rim. In other words, it has been found that whether the ring member 31 is used with the cover or not, the outwardly flared or angled disposition of the cover flange 25 and the fingers 27 assures a stiffer, more positive retention of the retaining finger terminals 28 against the intermediate flange 11.

Since the flange portion 25 and the retaining fingers 27 angle generally radially outwardly divergently from and behind the underturned cover flange portion 24, there is, in effect, provided an opposed shouldering relationship between which the ring rib flange 33 is retained against axial displacement relative to the cover margin on the cover as an assembled component of the cover. Additionally, the ring member inner marginal flange 33 is preferably elastically tensioned about the cover flange 25 and as a result of the tensioning draws into the cover flange groove 35. In other words, the ring flange portion 33 is elastically self-seating into the groove 35. Due to the elasticity of the ring inner marginal flange 33, it can readily be assembled by snapping it past the retaining finger terminal flanges 28 into assembly with the cover.

In the assembled relationship on the wheel, the thickened rib flange 33 is not only interlocked with the cover margin, but also with the rim shoulder 13, and this interlocked relationship is enhanced by engagement of a generally radially outwardly and axially inwardly opening annular groove 39 on the inner face of the flange portion 33 internestingly seated on the rim shoulder 13. Moreover, on the wheel, the inner marginal portion 33 of the ring member affords a cushioning and sound deadening or damping annulus behind the cover margin.

In the modification of Figure 3, the cover arrangement including the tire sidewall simulating ring member and the wheel are substantially the same as in Figure 2, except that an alternative manner of retaining engagement of the cover with the wheel is provided. For this reason in Figure 3 similar parts and elements are identified by primed reference numerals and it will be understood that with respect to such parts and elements the description thereof given in connection with Figure 2 is identical except as now modified. In this form, the intermediate flange 11' is provided with a circumferentially spaced series of radially inwardly pressed cover retaining protrusions or bumps 40, and the generally axially inwardly and radially outwardly angled cover flange portion 25' is provided with a turned terminal resilient retaining bead 41 which is retainingly engageable in press-on, pry-off relation with the retaining bumps 40. The construction and relationship are such that after the bead 41 has been pressed into engagement behind the bumps 40 and more particularly in engagement with the generally radially and axially inwardly directed shoulders of the bumps, the cover shoulder 23' is drawn tightly against the intervening portion of the ring member 31' in the groove 34' thereof for thereby clamping the ring member against the tire rim. While the flange 25' is shown as straight, it may be curved similarly as the flange 25 in Figure 2, although since the bead 41 is continuous the additional resilient stiffness afforded by the arched form of the flange may not afford as much advantage as is gained with the retaining finger extensions 27 in Figure 2. Of course, where the material of the cover and its cold workability, and other factors warrant, the flange 25 in Figure 2 may also be made straight.

It will be understood that modifications and variations may be effected without departing from the scope of the novel concepts of the present invention.

I claim as my invention:

1. In a wheel structure including a tire rim having an intermediate flange and a terminal flange providing a shoulder at juncture thereof, a circular assembly for disposition over the outer side of the wheel including a circular sheet metal member having a turned margin providing a reentrant groove therebehind and a retaining flange projecting generally radially outwardly and axially inwardly and having terminal means engageable with the intermediate flange, and a tire sidewall simulating non-metallic ring member having a body portion for overlying the adjacent portion of the tire sidewall and the terminal flange and provided with an interlock rib on its inner margin engaged in said reentrant groove and clamped against said rim shoulder by said turned margin through the action of said terminal means engaging the intermediate flange and thus retaining the turned margin in clamping relation to said shoulder.

2. In a wheel structure including a tire rim with an intermediate flange and a terminal flange joined on a rounded shoulder, a cover member for disposition over the outer side of the wheel including a marginal portion extending generally axially inwardly and radially outwardly convergently toward the terminal flange and providing a terminus disposed in axially outwardly overlying relation to said shoulder, said marginal portion having therebehind a reentrant groove formation opening generally toward the rim shoulder and including a retaining flange projecting generally radially outwardly and axially inwardly and having terminal means engageable with the intermediate flange, and a non-metallic resilient rubber-like tire sidewall simulating member having a body portion for overlying the adjacent portion of a tire sidewall and the terminal flange and having an inner rib projecting generally radially inwardly and axially outwardly and engaged within said groove formation, the body of the sidewall simulating member having at juncture with the rib a generally axially outwardly opening groove disposed opposite said shoulder and into which outwardly opening groove said terminus engages clampingly toward said shoulder, whereby through the coaction of said terminus engaging in said outwardly opening groove and the projection of said rib into said groove formation and the engagement of said retaining flange with the intermediate flange the sidewall simulating member is interlocked with the cover member and the tire rim.

3. In a wheel structure including a wheel body and a multi-flange tire rim supported thereby and having a generally axially extending and radially inwardly facing intermediate flange merging into a terminal flange on a rounded shoulder and adapted to support a tire with a sidewall bulging axially outwardly into overlying relation to the terminal flange, a circular member for overlying the wheel and having an outer marginal portion for overlying the tire rim with an underturned terminus edge having extending generally radially inwardly and axially outwardly therefrom a continuous annular turned flange with the radially inner portion of the flange turned generally axially inwardly and divergently radially outwardly and affording with the underturned flange a reentrant groove, the axially inner portion of said axially inwardly and radially outwardly extending flange portion having terminal means for circular member retaining engagement with the intermediate flange of the tire rim and said underturned terminus edge providing a shoulder directed to thrust toward said rim shoulder, and a tire sidewall simulating non-metallic ring member of resilient flexible form for overlying the adjacent portion of the tire sidewall and the terminal flange and having an inner marginal thickened rib generally radially inwardly extending flange with a generally axially outwardly projecting portion thereof engaged interlockingly in said reentrant groove and an axially inner portion thereof interposed between said axially and radially extending circular member flange and the axially outer portion of the intermediate flange and with the juncture of said ring rib flange with the body of the ring member having a generally axially outwardly and radially inwardly opening groove disposed opposite said rounded shoulder and within which is clampingly engaged said terminus edge of the circular member and thereby interlocking the ring rib flange with said outer marginal portion of the circular member and the rim shoulder.

References Cited in the file of this patent

UNITED STATES PATENTS

| | | |
|---|---|---|
| 2,607,632 | Lyon | Aug. 19, 1952 |
| 2,607,633 | Lyon | Aug. 19, 1952 |
| 2,624,634 | Lyon | Jan. 6, 1953 |
| 2,665,948 | Lyon | Jan. 12, 1954 |
| 2,725,257 | Maurer et al. | Nov. 29, 1955 |
| 2,862,769 | Wood | Dec. 2, 1958 |

FOREIGN PATENTS

| | | |
|---|---|---|
| 1,061,278 | France | Nov. 25, 1953 |
| 503,166 | Italy | Dec. 3, 1954 |
| 1,100,164 | France | Mar. 30, 1955 |